United States Patent [19]

Takagawa et al.

[11] Patent Number: 4,891,419
[45] Date of Patent: Jan. 2, 1990

[54] MODIFIED POLYESTER RESIN COMPOSITION CONTAINING ISONANOIC ACID AND A CYCLIC ESTER

[75] Inventors: Ryozo Takagawa, Osaka; Hisaki Tanabe, Kyoto; Koichi Inoue, Hyogo; Hirotoshi Umemoto, Kyoto, all of Japan

[73] Assignee: Nippon Paint Company, Ltd., Osaka, Japan

[21] Appl. No.: 119,834

[22] Filed: Nov. 12, 1987

[51] Int. Cl.$^4$ .............................................. C08G 63/04
[52] U.S. Cl. .................... 528/274; 525/437; 525/448
[58] Field of Search ............... 528/354, 295.5, 274; 525/437, 448

[56] References Cited

U.S. PATENT DOCUMENTS 3,502,623  3/1970  Harworth et al. ................ 528/354
3,663,515  5/1972  Hostettler et al. ............... 528/354
4,031,047  6/1977  Dhein et al. ..................... 528/295.5

FOREIGN PATENT DOCUMENTS 21422   2/1983  Japan .
138732  8/1983  Japan .

Primary Examiner—John Kight
Assistant Examiner—Dennis R. Daley
Attorney, Agent, or Firm—Wenderoth, Lind & Ponack

[57] ABSTRACT

A modified polyester resin composition for coating use comprising a polyester resin modified with 5 to 30% by weight of the total solid of a branched fatty acid having 8 and more carbon atoms and with 5 to 30% by weight of the total solid of a cyclic ester represented by the formula:

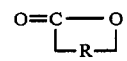

wherein R represents an alkylene group having 4 to 10 carbon atoms, the resin having a hydroxyl value of 70 to 300. The present resin composition is specifically useful as resinous vehicle in a top coat composition for plastic and other substrates.

3 Claims, No Drawings

MODIFIED POLYESTER RESIN COMPOSITION CONTAINING ISONANOIC ACID AND A CYCLIC ESTER

FIELD OF THE INVENTION

The present invention relates to a modified polyester resin composition for coating use and more specifically, it concerns a resinous composition comprising a polyester resin modified with a branched fatty acid and with a cyclic ester and being specifically useful as a resinous vehicle in a top coat composition for plastic and other substrates.

BACKGROUND ART

As a top coat composition, various fundamental requirements as weather resistance, chemical resistance and appearance of the coating and interlaminar adhesion and recoatability of the composition must be cleared out. Recently, in the automobile and other industries, public attention has been paid to the coating on plastic material. At that time, improved bending and adhesion properties sufficient enough to be tolerable to the processing conditions are in fact required for the top coat made of the said coating composition.

Heretofore, as a top coat for automobile bodies, an alkyd resin base composition has been widely used because of its excellent flowing properties and good appearance of the coating. However, there are problems, in that it has in such paint, of poor chemical resistance as poor acid resistance, such and alkaline resistance. Though an oil-free polyester resin is excellent in chemial resistance, the coating formed is poor in flowability and hence in appearance, and therefore, such resin has hardly been practically used as a top coat vehicle in the related field.

It is, therefore, an object of the invention to provide a polyester resin composition which is specifically useful as a resinous vehicle in a top coat composition and capable of resulting in a coating with excellent chemical resistance, interlaminar adhesion, recoatability, weather resistance and flexibility, as well as the predominant properties of an alkyd resin as flowability and film appearance.

SUMMARY OF THE INVENTION

According to the invention, the aforesaid object can be attained with a modified polyester resin composition comprising a polyester resin modified with 5 to 30% by weight of the total solid of a branched fatty acid having 8 and more carbon atoms and with 5 to 30% by weight of the total solid of a cyclic ester represented by the formula:

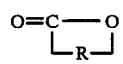

wherein R represents an alkylene group having 4 to 10 carbon atoms, the resin having a hydroxyl value of 70 to 300.

PREFERRED EMBODIMENTS OF THE INVENTION

In this invention, a polyester resin obtained by polycondensation of a polybasic acid and polyhydric alcohol, is first modified with a branched fatty acid having 8 and more carbon atoms and the amount of said fatty acid is controlled so as to be in an amount of 5 to 30% by weight of the total solids.

In the preparation of an alkyd resin, various fatty acids having different oil lengths have been generally used. Among them, a long linear chain fatty acid is specifically useful for modification purposes because the resulting resin is low in viscosity and can give a coating with excellent flowability and coating appearance. However, it is generally recognized that a polyester resin modified with a long linear chain fatty acid is poor in deflection property, pigment miscibility and storage stability of the resinous composition and the coating prepared therefrom is poor in weather resistance, water resistance and chemical resistance, which are weak points generally possessed by an alkyd resin.

The inventors have now surprisingly found that when a branched fatty acid having 8 and more carbon atoms is used for the modification of a polyester resin, thereby bonding bulky fatty acid side chains to a polyester main chain the, chemical resistance of the coating prepared from the thus obtained resin is markedly improved by the steric effect originated in the specific structure of the resin, while maintaining the desired properties usually expected from the modification of such polyester resin with a linear chain fatty acid.

In this invention, any of the branched type fatty acids having 8 and more carbon atoms may be satisfactorily used and however, particularly preferable members are as follows: isooctanoic acid, isodecanoic acid, isononanoic acid, isotridecanoic acid, versatic acid and the like.

When a comparatively long chain fatty acid having 8 and more carbon atoms is used in the modification of polyester resin, the amount of said fatty acid is usually selected in a range of 50 to 60% by weight of the resin. However, in the present invention, the aforesaid branched fatty acid is used in 5 to 30% by weight of the total solid of the final resin. This is because if the amount of said fatty acid exceeds the upper limit of 30% by weight of the total solid, there is a tendency to lower the chemical resistance of the coating, whereas in an amount of less than 5% by weight, one cannot expect the desired effects of fatty acid modification and especially the desired improvement in coating appearance therefrom.

The modification of polyester resin with a branched fatty acid is carried out in the usual way.

In the present invention, besides the modification with a particular amount of a particular fatty acid, the mother polyester resin is also modified with 5 to 30% by weight of the total solid of a cyclic ester represented by the formula:

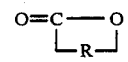

wherein R represents an alkylene group having 4 to 10 carbon atoms.

Typical examples of said cyclic ester are ε-caprolactone, ζ-enantholacton, η-caprylolactone and their ring substituted derivatives. Particularly preferred members are ε-caprolactone and its substituted derivatives. By the inclusion of such cyclic ester into a polyester resin, improved flexibility is given to the resin and bending property and adhesion property of the coating are markedly improved. Highly reactive primary hydroxyl groups are also produced in the resin as the result of said modification.

The amount of said cyclic ester is limited to a range of 5 to 30% by weight of the total solid of the final resin. This is because if the cyclic ester amount is less than 5% by weight, the modification effect can not be fully attained and if the said amount is more than 30% by weight, too excessive flexibility is given to the formed resin, thereby resulting a lowering of the chemical resistance and water resistance of the coating of the resin, in turn.

In the actual modification, a polyester resin or a fatty acid modified polyester resin is added with the required amounts of cyclic ester and the combined mixture is heated according to a conventional way.

At that time, the added cyclic ester is ring-opened and reacted with a hydroxyl group of said polyester resin to give the desired modified resin.

In this reaction, it is preferred to use a catalyst as tin compounds, organic lead or manganese salts, and the like. Particularly preferred catalysts are the tin compounds of the formula:

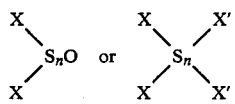

wherein X stands for an alkyl, an aryl, an aralkyl, or an aryloxy group, and X' is an alkyl, an aryl, an aralkyl, an acyloxy, a halogen or hydroxyl group.

Examples are tetraphenyl tin, tetraoctyl tin, diphenyl tin dilaurate, tri-n-butyl in hydroxide, tri-n-butyl in acetate, dimethyl tin oxide, dibutyl tin oxide, dilauryl tin oxide, di-n-butyl tin dichloride, dioctyl tin dichloride and the like. Examples of other catalysts are lead acetate, manganese acetate, lead 2-ethyl hexane acetate, lead salicylate, lead benzoate and the like.

The present modified polyester resin is thus characterized by being modified with a particular amount of branched fatty acid and also with a particular amount of cyclic ester, and however, the hydroxyl value of the final resin should be in the range of 70 to 300. This is because, if the hydroxyl value is less than 70, there is a problem that when combined with an isocyanate hardener, curing is too poor to obtain the desired coating with excellent weather resistance, chemical resistance and hardness, whereas if the hydroxyl value exceeds the upper limit of 300, there is another problem in that curing proceeds too excessively, resulting in superfluous cross-density which is not suitable for the object of this invention.

The aforesaid modifications with a branched fatty acid and with a cyclic ester may be carried out in any successive order, however, preference is given to the case wherein the fatty acid modification is first carried out and the cyclic ester modification is then followed.

The thus obtained modified polyester resin of this invention is specifically useful for the preparation of room temperature drying type or forced drying type coating composition in combination with an isocyanate hardener.

Such coating compositions are excellent in adhesion properties and can result in coatings with excellent appearance, weather resistance, hardness, water resistance, chemical resistance, bending properties and recoatability. Therefore, they are useful as a top coat for automobile bodies and especially plastic parts thereof, plastics, woods and other various substrates.

The invention shall be now more fully explained in the following Examples. Unless otherwise being stated, all parts and percentages are by weight.

EXAMPLE 1

Into a 3 liter reaction vessel fitted with a heating device, a stirrer, a refluxing device, a water separator, a fractionating column and a thermometer, were placed 443 parts of trimethylol propane, 399 parts of neopentyl glycol, 98 parts of isononanoic acid, 407 parts of isophthalic acid and 569 parts of hexahydro phthalic anhydride, and the mixture was added with 4 parts of dibutyl tin oxide and heated at 80° to 100° C.

When the content reached stirrable conditions, stirring was started and the inner temperature was raised to 180° C. Heating was continued, while removing the formed water out of the system, and the temperature was raised gradually to 240° C. and then the reaction was continued at the same temperature for 2 hours. Thereafter, xylene was added to the reaction vessel and condensation reaction was continued under refluxing until the resinous acid value reached 9.0. The reaction mixture was allowed to cool to 100° C. and added with 195 parts of ε-caprolactone. Then the combined mixture was heated to 150° C. and the reaction was continued at the same temperature until the resinous acid value reached 8.0.

After cooling, 1050 parts of xylene were added to obtain a modified polyester resin varnish A, whose non-volatile content was 65.1%, viscosity was V and resinous acid value was 8.1 mgKOH/g.

EXAMPLES 2-3

Using the same procedures as stated in Example 1 but substituting the materials shown in Table 1 for those of Example 1, modified polyester resin varnishes B and C were prepared. The characteristics of these varnishes are shown in Table 1.

EXAMPLE 4

Into a similar reaction vessel as used in Example 1, were placed 667 parts of trimethylol propane, 91 parts of neopentyl glycol, 389 parts of isodecanoic acid, 320 parts of isophthalic acid and 446 parts of hexahydrophthalic anhydride and the mixture was reacted as in Example 1. After cooling the reaction mixture, 195 parts of ε-caprolactone were added and reacted as in Example 1. Then, 1050 parts of xylene were added to obtain a modified polyester resin varnish D. The characteristics of said varnish are shown in Table 1.

EXAMPLES 5-9

Using the same procedures as stated in Example 1 but substituting the materials shown in Table 1 for those of Example 1, modified polyester resin varnishes E to I were prepared, respectively. The characteristics of these varnishes are shown in Table 1.

EXAMPLE 10

Into a 3 liters reaction vessel fitted with a heating device, a stirrer, a refluxing device, a water separator, a fractionating column and a thermometer, were placed 696 parts of trimethylol propane, 51 parts of neopentyl glycol, 383 parts of isononanoic acid, 315 parts of isophthalic acid and 441 parts of hexahydro phthalic anhydride, and the mixture was added with 4 parts of dibutyl tin oxide and heated at 80° to 100° C.

When the content reached stirrable conditions, stirring was started and the inner temperature was raised to 180° C. Heating was continued, while removing the formed water out of the system, and the temperature was raised gradually to 240° C. and then the reaction was continued at the same temperature for 2 hours. Thereafter, xylene was added to the reaction vessel and condensation reaction was continued under refluxing until the resinous acid value reached 10.0. The reaction mixture was allowed to cool to 100° C. and added with 222 parts of δ-valerolactone and 4 parts of tetraisopropoxy titanate. Then the combined mixture was heated to 180° C. and the reaction was continued at the same temperature until the reaction rate measured by IR means reached 90% and more.

After cooling, 1050 parts of xylene were added to obtain a modified polyester resin varnish J, whose non-volatile content was 65.0%, viscosity was V and resinous acid value was 8.0 mgKOH/g.

EXAMPLE 11

Using the same procedure as stated in Example 10 but substituting 220 parts of ζ-enantholactone for 220 parts of δ-valerolactone to obtain a modified polyester resin varnish K. The characteristics of this varnish are shown in Table 1.

COMPARATIVE EXAMPLE 1

Into a similar reaction vessel as used in Example 1, were placed 614 parts of trimethylol propane, 136 parts of neopentyl glycol, 389 parts of coconut oil fatty acid, 321 parts of isophthalic acid and 449 parts of hexahydrophthalic anhydride and the mixture was reacted as in Example 1 and allowed to cool.

Thereafter, 195 parts of ε-caprolactone were added and reacted as in Example 1. Finally, 1050 parts of xylene were added to obtain a comparative resin varnish L. The characteristics of said varnish are shown in Table 1.

COMPARATIVE EXAMPLES 2–7

Using the materials shown in Table 1 and following the procedures of Comparative Example 1, comparative resin varnishes M to R were prepared, respectively. The characteristics of these varnishes are shown in Table 1.

EXAMPLE 12

Using the modified polyester resin varnish A obtained in Example 1, a white colored dispersion paste was prepared as prescribed in the following Table A and then, a white colored coating composition was prepared as prescribed in Table B.

TABLE A

| Formulation of white colored dispersion paste | |
|---|---|
| resin varnish | 39 parts |
| Titanium CR-97* | 51 |
| solvent | 10 |
| Total | 100 parts |

*Titanium white pigment, manufactured by Ishihara Sangyo.

TABLE B

| Formulation of white colored coating composition | |
|---|---|
| white colored dispersion paste | 76 parts |
| resin varnish | 19 |
| solvent | 5 |

TABLE B-continued

| Formulation of white colored coating composition | |
|---|---|
| Total | 100 parts |

To 100 parts of thus obtained coating composition, 20 parts of Sumidule N-75 (polyisocyanate hardener, trademark of Sumitomo Bayer Co.) were added and the combined mixture was diluted with a mixed solvent of toluene:mineral spirt:Solvesso 100:Solvesso 150=30:20:25:25 (by weight) to a viscosity of 20 seconds/No. 4 Ford Cup (20° C.).

Soft RIM plate was degreased and applied with a primer coating.

Onto thus pre-treated test plate, the abovesaid diluted coating composition was spary-coated and after standing for a defined period of time, the coating was baked at 90° C. for 20 minutes.

Thus obtained coating was tested and evaluated as follows:

(1) Film surface condition

Film surface condition was evaluated by visual observation of finishing appearance, gloss and sharpness of the coating, with the following standard.
◎ very good
○ good
Δ rather poor
X very poor (2) Adhesion property After making 100 (2×2 mm) cross-cuts, tape peeling test was carried out and the residual cross-cuts percentage was determined, which was used as the standard for evaluating adhesion property of the coating.

(3) Acid resistance

1/10N sulfuric acid solution was dropped onto a test coating and after 24 hours later, acid resistance was evaluated by checking blister, gloss and white blooming of the coating.
○ no change
Δ certain blisters
X many blisters and loss in gloss (4) Alkaline resistance 1/10N NaOH solution was dropped onto a test coating and after 24 hours later, alkaline resistance was evaluated by checking blister, gloss and white blooming of the coating. The same evaluation criteria as used in the preceding para. 3 were used.

(5) Blending property

After keeping a test specimen at −30° C. for 2 hours, the coating was subjected to a bending test by using 50 mm mandrel tester and bending property was evaluated from the cracking condition of the coating.
○ no cracking
Δ linear cracks
X peeling The test results are shown in the following Table 2.

EXAMPLES 13–22

Using the same procedures as stated in Examples 1 and resin varnishes B to K obtained in Example 2 to 11, various coating compositions were prepared. After coating, the film properties were evaluated as in Example 1. The test results are shown in Table 2.

COMPARATIVE EXAMPLES 8–14

Repeating the procedures of Example 1 but substituting the resin varnishes L to R for the varnish A, comparative coating compositions were prepared. After coating, the film properties were evaluated as in Example 1. The test results are shown in Table 2.

TABLE 1

| Example | 1 | 2 | 3 | 4 | 5 |
|---|---|---|---|---|---|
| Varnish | A | B | C | D | E |
| Composition | | | | | |
| isophthalic acid | 407 | 378 | 319 | 320 | 337 |
| hexahydrophthalic anhydride | 569 | 528 | 446 | 446 | 470 |
| isononanoic acid | 98 | 194 | 388 | — | 410 |
| isodecanoic acid | — | — | — | 389 | — |
| trimethylol propane | 443 | 525 | 699 | 667 | 736 |
| neopentyl glycol | 399 | 291 | 62 | 91 | 69 |
| ε-caprolactone | 195 | 195 | 195 | 195 | 97 |
| coconut oil fatty acid | — | — | — | — | — |
| xylene | 1050 | 1050 | 1050 | 1050 | 1050 |
| Characteristics | | | | | |
| non-volatile content (%) | 65.1 | 65.0 | 65.0 | 64.8 | 64.9 |
| resinous acid value (mgKOH/g) | 8.1 | 8.1 | 8.0 | 8.0 | 8.2 |
| varnish viscosity | V | U-UV | T-U | T-U | V |
| Fatty acid content (wt %/solid) | 5 | 10 | 20 | 20 | 20 |
| Cyclic ester content (wt %/solid) | 10 | 10 | 10 | 10 | 5 |
| Hydroxyl value (mgKOH/g) | 140 | 140 | 140 | 140 | 140 |

| Example | 6 | 7 | 8 | 9 |
|---|---|---|---|---|
| Varnish | F | G | H | I |
| Composition | | | | |
| isophthalic acid | 315 | 267 | 344 | 331 |
| hexahydrophthalic anhydride | 441 | 373 | 480 | 463 |
| isononanoic acid | 383 | 324 | 389 | 193 |
| isodecanoic acid | — | — | — | — |
| trimethylol propane | 696 | 589 | 435 | 722 |
| neopentyl glycol | 51 | 44 | 277 | 190 |
| ε-caprolactone | 222 | 488 | 195 | 195 |
| coconut oil fatty acid | — | — | — | — |
| xylene | 1050 | 1050 | 1050 | 1050 |
| Characteristics | | | | |
| non-volatile content (%) | 65.2 | 65.0 | 65.0 | 65.1 |
| resinous acid value (mgKOH/g) | 7.8 | 7.9 | 7.9 | 8.0 |
| varnish viscosity | U-UV | T-U | T-U | U |
| Fatty acid content (wt %/solid) | 20 | 20 | 20 | 20 |
| Cyclic ester content (wt %/solid) | 10 | 25 | 10 | 10 |
| Hydroxyl value (mgKOH/g) | 140 | 140 | 70 | 250 |

| Example | 10 | 11 |
|---|---|---|
| Varnish | J | K |
| Composition | | |
| isophthalic acid | 315 | 315 |
| hexahydrophthalic anhydride | 441 | 441 |
| isononanoic acid | 383 | 383 |
| isodecanoic acid | — | — |
| trimethylol propane | 696 | 696 |
| neopentyl glycol | 51 | 51 |
| ε-caprolactone | — | — |
| δ-valerolactone | 222 | — |
| ζ-enantholactone | — | 222 |
| coconut oil fatty acid | — | — |
| xylene | 1050 | 1050 |
| Characteristics | | |
| non-volatile content (%) | 65.0 | 64.9 |
| resinous acid value (mgKOH/g) | 8.0 | 7.8 |
| varnish viscosity | V | UV |
| Fatty acid content (wt %/solid) | 20 | 20 |
| Cyclic ester content (wt %/solid) | 10 | 10 |
| Hydroxyl value (mgKOH/g) | 140 | 140 |

| Comparative Example | 1 | 2 | 3 | 4 | 5 |
|---|---|---|---|---|---|
| Varnish | L | M | N | O | P |
| Composition | | | | | |
| isophthalic acid | 321 | 413 | 275 | 323 | 249 |
| hexahydrophthalic anhydride | 449 | 577 | 385 | 547 | 348 |
| isononanoic acid | — | 77 | 583 | 393 | 302 |
| isodecanoic acid | — | — | — | — | — |
| trimethylol propane | 614 | 426 | 618 | 705 | 550 |
| neopentyl glycol | 136 | 423 | 59 | 66 | 41 |
| ε-caprolactone | 195 | 195 | 195 | 78 | 600 |
| coconut oil fatty acid | 389 | — | — | — | — |
| xylene | 1050 | 1050 | 1050 | 1050 | 1050 |
| Characteristics | | | | | |
| non-volatile content (%) | 65.1 | 64.7 | 64.9 | 64.9 | 65.0 |
| resinous acid value (mgKOH/g) | 7.8 | 7.9 | 7.9 | 8.0 | 7.3 |
| varnish viscosity | T-U | V>W | S-T | V>W | S |
| Fatty acid content (wt %/solid) | 20 | 4 | 30 | 20 | 20 |
| Cyclic ester content (wt %/solid) | 10 | 10 | 10 | 4 | 31 |
| Hydroxyl value (mgKOH/g) | 140 | 140 | 140 | 140 | 140 |

| Comparative Example | 6 | 7 |
|---|---|---|
| Varnish | Q | R |
| Composition | | |
| isophthalic acid | 358 | 319 |
| hexahydrophthalic anhydride | 489 | 446 |
| isononanoic acid | 389 | 181 |
| isodecanoic acid | — | — |
| trimethylol propane | 420 | 946 |
| neopentyl glycol | 279 | — |
| ε-caprolactone | 195 | 195 |
| coconut oil fatty acid | — | — |
| xylene | 1050 | 1050 |
| Characteristics | | |
| non-volatile content (%) | 65.0 | 65.2 |
| resinous acid value (mgKOH/g) | 8.2 | 8.1 |
| varnish viscosity | T | V |
| Fatty acid content (wt %/solid) | 20 | 20 |
| Cyclic ester content (wt %/solid) | 10 | 10 |
| Hydroxyl value (mgKOH/g) | 56 | 310 |

TABLE 2
Film properties

| Example | 12 | 13 | 14 | 15 |
|---|---|---|---|---|
| varnish | A | B | C | D |
| Composition | | | | |
| coating composition | 100 | 100 | 100 | 100 |
| hardener | 20 | 20 | 20 | 20 |
| Film properties | | | | |
| film surface condition | ◎ | ◎ | ◎ | ◎ |
| adhesion property | 100/100 | 100/100 | 100/100 | 100/100 |
| acid resistance | ○ | ○ | ○ | ○ |
| alkaline resistance | ○ | ○ | ○ | ○ |
| bending property | ○ | ○ | ○ | ○ |

| Example | 16 | 17 | 18 | 19 |
|---|---|---|---|---|
| varnish | E | F | G | H |
| Composition | | | | |
| coating composition | 100 | 100 | 100 | 100 |
| hardener | 21 | 20 | 17 | 10 |
| Film properties | | | | |
| film surface condition | ◎ | ◎ | ◎ | ◎ |
| adhesion property | 100/100 | 100/100 | 100/100 | 100/100 |
| acid resistance | ○ | ○ | ○ | ○ |
| alkaline resistance | ○ | ○ | ○ | ○ |
| bending property | ○ | ○ | ○ | ○ |

| Example | 20 | 21 | 22 |
|---|---|---|---|
| varnish | I | J | K |
| Composition | | | |
| coating composition | 100 | 100 | 100 |
| hardener | 36 | 20 | 20 |
| Film properties | | | |
| film surface condition | ○ | ◎ | ◎ |
| adhesion property | 100/100 | 100/100 | 100/100 |
| acid resistance | ○ | ○ | ○ |
| alkaline resistance | ○ | ○ | ○ |
| bending property | ○ | ○ | ○ |

| Comparative Example | 8 | 9 | 10 | 11 |
|---|---|---|---|---|
| varnish | L | M | N | O |
| Composition | | | | |

TABLE 2-continued

| Film properties | | | | |
|---|---|---|---|---|
| coating composition | 100 | 100 | 100 | 100 |
| hardener | 20 | 20 | 20 | 21 |
| Film properties | | | | |
| film surface condition | O | Δ | Δ | Δ |
| adhesion property | 95/100 | 95/100 | 95/100 | 95/100 |
| acid resistance | X | X | Δ~X | Δ~X |
| alkaline resistance | Δ | Δ | Δ | Δ |
| bending property | Δ | Δ | Δ | X |

| Comparative Example | 12 | 13 | 14 |
|---|---|---|---|
| varnish | P | Q | R |
| Composition | | | |
| coating composition | 100 | 100 | 100 |
| hardener | 16 | 8 | 43 |
| Film properties | | | |
| film surface condition | Δ | Δ~X | Δ~O |
| adhesion property | 100/100 | 95/100 | 80/100 |
| acid resistance | Δ~X | Δ~X | Δ |
| alkaline resistance | Δ | Δ | Δ |
| bending property | O | Δ | X |

What is claimed is:

1. A modified polyester resin composition useful as a coating comprising a polyester resin modified with 5 to 30% by weight of the total solid content of isononanoic acid and with 5 to 30% by weight of the total solid content of a cyclic ester represented by the formula:

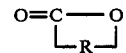

wherein R represents an alkylene group having 4 to 10 carbon atoms, the resin having a hydroxyl value of 70 to 300.

2. A composition according to claim 1, wherein the cyclic ester is ε-caprolactone.

3. A composition according to claim 1, wherein the hydroxyl value is 100 to 200.

* * * * *